United States Patent Office

3,801,717
Patented Apr. 2, 1974

3,801,717
TREATMENT OF FRUIT JUICES
Carl Franklin Huffman, Maitland, Fla., assignor to The Coca-Cola Company, New York, N.Y.
No Drawing. Continuation of abandoned application Ser. No. 33,888, May 1, 1970. This application June 23, 1972, Ser. No. 266,970
Int. Cl. A23l 3/00, 1/36
U.S. Cl. 426—270
11 Claims

ABSTRACT OF THE DISCLOSURE

A process is provided for treating beverages and liquid foods with an ion exchange resin before heating to retard the formation of unnatural flavors, aromas or color.

---

This is a continuation of application Ser. No. 33,888 filed May 1, 1970 and now abandoned.

FIELD OF INVENTION

This invention relates to the preparation of fruit juices, beverages and liquid foods with retained natural flavor and aroma characteristics. More specifically, the invention relates to a process for retarding the formation of unnatural flavors, aromas or colors in the preparation of fruit juices.

DESCRIPTION OF PRIOR ART

In the normal preparation of juices and in particular fruit juice such as orange and lemon juice, the juices are extracted such as by pressure and following extraction from the fruit are heated to pasteurize the juice and retard enzymatic action. Temperatures in the range of 185–210° F. are frequently employed for pasteurization of orange juice.

Temperatures as low as about 165° F. may be employed for pasteurization of more acidic products such as lemon juice. Such heating normally imparts to the juice a changed aroma or flavor which is easily distinguishable in most products. Frequently, the juices may develop a brown or dark color. The reaction is known variously as "the browning reactions," "nonenzymic browning," "melanoin formation," "caramelization," "Maillard reaction"—Ref:, C. P. Ellis—The Maillard Reaction, Advances in Carbohydrate Chemistry, vol. 14, (1959), pp. 63–134) and the resulting product is frequently characterized as exhibiting a cooked aroma or flavor. Some foods and beverages are more susceptible to undesirable browning and off-flavor formation than others. Among citrus products, for example, lemon juice browns very easily.

The flavor or aroma of other beverages or liquid foods such as milk, tea, and coffee also may be adversely affected by heat. For example, tea and coffee frequently are characterized as having a bitter taste. Milk unless subjected to carefully controlled processing conditions may be characterized by a cooked taste.

U.S. Pat. No. 2,592,563 suggests that the cooked aroma or flavor which is the result of the browning reaction may occur from a reaction between the amino acids and sugar in the fruit. Extensive research into this question has been conducted for many years in an attempt to determine precisely what causes the cooked aroma or flavor but no unequivocal answer to the question is known to exist.

Various attempts have been made to overcome the detrimental effect of heating on flavor and aroma, but all attempts have met with little success. One well-known method of preserving such foods and beverages is frozen storage where the products receive minimum heat treatment. Bacterial action, browning and off-flavor formation are thus inhibited by low temperature storage. However, the need remains for a process that will permit heat treatment to inhibit bacterial growth and inactivate enzymes while at the same time yielding a product that will not develop browning and off-flavor during storage.

The prior art suggests that ion exchange may be used to increase acidity and thereby to have an effect on taste by the increased acidity. U.S. Pat. No. 2,478,298 discloses, inter alia, a method of treating grape juice to remove potassium from the juice by passing the juice through a cationic exchange resin. U.S. Pat. No. 2,667,417 discloses passing the juice through a synthetic cationic exchange resin to remove heavy metal ions to prevent formation of precipitable potassium bitartrate and precipitable calcium tartrate. The juice is then passed through a synthetic anion exchange resin to raise its pH. U.S. Pat. No. 3,165,415 discloses the use of an ion exchange resin to alter the pH of a natural fruit juice for the improvement of the taste of the fruit juice. U.S. Pat. No. 3,219,458 discloses the addition of stannous ions to citrus juice products retards or inhibits the browning of such products.

Certain chemicals such as sulfur dioxide are now being used to retard browning in food products stored at ambient temperature, but sulfur dioxide introduces a characteristic disagreeable off-flavor and makes the products undesirable to the consumer.

SUMMARY OF INVENTION

It is an object of the present invention to prepare fruit juices, natural beverages and food products with natural flavor and aroma characteristics. It is a further object of the present invention to inhibit the browning reaction normally associated with the preparation of fruit juices, and some natural beverages and food products. It is a It is an object of the present invention to prepare fruit juices such as orange juice or lemon juice in which the cooked aroma or flavor is substantially diminished or virtually eliminated. It is yet another object of the present invention to product fruit juices which can be subsequently heat-treated and stored.

It has now been discovered that the objects of the present invention may be accomplished by treating the fruit juices, natural beverages or food products before heating by contacting the juices, natural beverages or food products with an ion exchange resin for a short period of time. While either anionic or cationic exchange resins or a combination of both may be used, the preferred exchanged resins are cationic particularly with reference to citrus juice products.

DETAILED DESCRIPTION OF INVENTION

Simply stated, the process is that of bringing a fruit juice, natural beverage, or liquid food into contact with an ion exchange material for a short period of time and thereafter separating the juice, etc., from the ion exchange material. This short contact time with the ion exchange material increases the resistance of the juice, etc., to abuse so that the juice, etc., can then be heat-treated and stored without the formation of off-flavors to any marked extent.

Following treatment, the juice is separated from the resin and may be sent for further processing depending on the desired end use. For example, if a concentrated juice is desired, the juice may be subjected to evaporative conditions to remove water. If it is desired thereafter to prepare a dried product, the juice or concentrated juice may be dried according to conventional methods such as vacuum belt drying, micro-flake drying, freeze drying, spray drying, vacuum self drying or Format drying.

It has been found that the best result are produced when a strong cationic ion exchange resin is used in contact with the juice, natural beverage, or liquid food. Suitable strong cationic ion exchange resins include Rohm &

Haas Amberlite IR–120 and Dow Chemical Company Dowex–50. Other commercial ion exchange materials of different types also produce beneficial results as will be apparent to those skilled in the art, but none has been found to yield as desirable results as the strong cationic type of ion exchange material.

While the objects of the invention may be achieved by using a limited amount of ion exchange material, most desirable results are obtained when an amount in excess of the stoichiometric amount is employed. The precise amount of ion exchange material to be employed will depend on the composition of the product being treated, treatment conditions, resin particle size and subsequent processing of the product; but in general, it has been found that up to about one pound of wet resin per pound of soluble solids in the material being treated will give the desired results. A preferred range of resin to soluble solids is about 0.5–1.0 pound of wet resin per pound of soluble solids. Amounts in excess of one pound of wet resin per pound of material to be treated may be employed, but economic considerations here become a factor.

For example, when orange juice is brought into contact with an excess of strong cationic ion exchange resin, the pH of the juice changes from 3.7 to 2.0. When a lesser amount of resin is used, so that the pH of the juice becomes 3.0, the resulting juice has more resistance to browning and off-flavor formation than the untreated juice, but exhibits less resistance than when treated with an excess of resin.

The resin material after use may be washed to remove materials that have accumulated on the resin. The washing medium may be water or other suitable liquid. At appropriate intervals, the resin may be regenerated with an acid solution such as a 5% solution of sulfuric acid or a 10% solution of hydrochloric acid.

A treatment of juice in accordance with the process of this invention results in removal of amino acids and amines which have been associated by other investigators with the formation of off-flavors. In addition, metallic ions such as potassium, sodium, calcium and magnesium ions are removed by the ion exchange resin.

It will be immediately apparent to those skilled in the art that many desirable objectives can be obtained in accordance with the process of the invention. By eliminating off-flavors and undesirable aromas, it is possible to prepare such products as improved hot-packed, single strength orange juice, improved hot-packed, single strength lemon juice, other improved hot-packed juice drinks as well as improved dried juice crystals or powders that may be subsequently reconstituted.

Furthermore, the present invention makes possible the storage of improved bulk concentrated citrus juices at ambient temperature and the manufacture of improved concentrated or single strength juices for non-refrigerated shelf storage.

The present invention will now be illustrated by the following examples in which all parts are by weight except as otherwise indicated.

EXAMPLE I

This example describes the preparation of a treated juice. Forty-four pounds of 65° Brix orange juice concentrate were diluted to 45° Brix and Valencia oil (14.2 ml. or 0.015% by volume) was added. The juice was further diluted to 18° Brix and was treated with 44.0 lbs. of Dowex–50W for ten minutes with stirring. The Dowex–50W was separated from the juice and the Brix of the juice was 15°. The pH was adjusted from 2.04 to 3.76 by the addition of 555 ml. of 45% potassium hydroxide solution followed by a final Brix adjustment to 12.5° using spring water. The product was heat stabilized and then hot-packed in cans. The cans were cooled in water and stored at 70–80° F. in a storage room.

A control sample of untreated juice was prepared in the same manner omitting the treatment with Dowex–50W and also omitting the pH adjustment.

Following storage for approximately 48 hours, one can of treated juice and one can of control were opened and taste-tested. The treated sample was found to exhibit a good taste and had only a slightly cooked flavor. The untreated sample was found to exhibit a poor taste and had a decidedly cooked flavor.

One week later, samples were taste-tested by a panel experienced in taste-testing orange juice and the panel exhibited a significant preference for the treated sample.

Four weeks after the treated sample and the control sample were prepared, they were submitted to a panel of experienced taste-tasters that were not conditioned to testing orange juice. The panel also showed a highly significant preference for the treated sample.

Three months later, one can of the treated juice and one can of the untreated juice were taste-tested. The treated juice exhibited a pleasant fruit odor whereas the untreated juice exhibited a strong cooked odor and taste.

EXAMPLE II

Ten pounds of 65° Brix Valencia orange juice were reconstituted at 13° Brix and treated with 10.0 lbs. of Amberlite IR–120H for ten minutes with stirring after which it had a Brix of 11.65°. The liquid was separated from the ion exchange resin. Thereafter the treated sample was neutralized to its original pH with potassium hydroxide solution.

0.10 ml. of Valencia orange oil was added to 2 gallons of single strength juice and twenty 12-oz. cans of the juice were hot-packed after heating to 200° F. for 30 seconds. These cans were cooled and stored at 70–80° F. (Sample A)

A second portion of the treated juice was concentrated to 45° Brix in a falling film evaporator under reduced pressure. Valencia orange oil was added and the concentrated juice was hot-packed in six 12-oz. cans after heating to 200° F. for 30 seconds. The cans were cooled. Four of these cans were stored at 70–80° F. in a storage room and two additional cans were stored in Dry Ice. (Sample B)

An additional amount of 65° Brix Valencia orange juice was reconstituted to 11.65° Brix and an appropriate amount of Valencia oil was added. The juice was hot-packed in eleven 12-oz. cans after heating to 200° F. for 30 seconds. The cans were cooled and stored at 70–80° F. (Sample C)

An additional amount of 65° Brix Valencia orange juice was diluted to 45° Brix concentrate. An appropriate amount of Valencia oil was added and the concentrate was hot-packed after heating to 200° F. for 30 seconds. Six 12-oz. cans were stored at 70–80° F. in a storage room and the remaining two cans were stored in Dry Ice. (Sample D)

One can of Sample A that had been stored 24 hours and one can of Sample C that had been stored 3 hours were opened and taste tested. Sample A, although stored for a longer period of time, was preferred over Sample C.

One can of Sample A stored for about 48 hours and one can of Sample C stored for about 24 hours were taste tested at 10:00 A.M. Sample A was very good, whereas Sample C had developed an off-flavor. At 3:45 P.M. after standing open for about six hours, Sample A still had a very good flavor, whereas the off-taste in Sample C was very evident.

One can of Sample A and one can of Sample C were placed in an oven and heated at 41° C. (105° F.). The cans were checked for swelling or other effects over a seven-day period. No adverse effects were noted. At this time, one can of Sample A was removed from the storage room and it, along with the two heated samples, was taste tested. The can of Sample A removed from the storage room exhibited no off-flavor or aroma. The can of Sample A that had been heated exhibited a slight cooked flavor and aroma, whereas the heated can of Sample C had a strong "off" or cooked flavor, a cooked aroma, and was darker than the can of heated Sample A, which in turn was slightly darker than the unheated can of Sample A.

After about three weeks, one can of Sample B and one can of the Sample D were opened and a portion of each can was reconstituted to approximately 12.5° Brix. Taste testing showed that Sample B exhibited little cooked or aged aroma and flavor while Sample D showed considerable cooked or aged aroma and flavor.

About 200 ml. of the 45° Brix juice remaining in each of the two opened cans were stored at 70–80° F. for 24 hours. The juice was then reconstituted to about 12.5° Brix. Sample B exhibited little cooked or aged aroma and flavor while Sample D seemed to exhibit even greater cooked or aged aroma and flavor than it had 24 hours previously.

EXAMPLE III

Approximately 80 gallons of single strength Valencia orange juice having a Brix of 10.14° were charged to a thermally accelerated short time evaporator to lower the oil content and raise the solids level for treatment. 210 lbs. of juice at 16.63° Brix and 3.58 pH were treated with 35.9 lbs. of wet IR–120 H resin (1 lb. wet resin per pound of total solids) and agitated for 15 minutes after which the pH of the juice was 1.75. The juice was separated from the resin and the pH of the juice was adjusted to 3.58 using 600 gm. of potassium hydroxide. Five gallons of spring water were added to adjust the Brix to 11.76°, 2.85 ml. of Valencia orange oil was added. The juice was hot-packed at 195° F. in 46-oz. cans.

To 215 lbs. of juice with a 17.54° Brix were added 12 gallons of spring water and 11.4 ml. of Valencia orange oil. The juice having an 11.76° Brix was hot-packed at 195° F. in 46-oz. cans.

Three days later, samples of the treated juice and the untreated juice were taste tested and the treated juice was preferred.

Seven weeks after preparation, a taste test was conducted and the results indicated a strong preference for the treated sample.

Approximately four months after preparation, a consumer taste test was conducted in stores in the Houston, Texas area. The results of the test indicated a significant preference for the treated product.

EXAMPLE IV 90.3 lbs. of 67.1° Brix concentrated orange juice having a total solids content of 60.5 lbs. were diluted to 20° Brix with water. 60.5 lbs. of wet Amberlite IR–120 H resin were added to the juice and the mixture was agitated for 15 minutes. The resin was separated from the juice. The pH of the juice which originally was 3.55 was now 1.95 and was readjusted to 3.55 with potassium hydroxide solution. The treated juice was evaporated using a thermally accelerated short time evaporator.

Treated juice having a 64.6° Brix was cold-packed in thirteen 46-oz. cans and seven 6-oz. cans. An additional amount of treated juice having a 62.8° Brix was cold-packed in four 46-oz. cans.

In like manner, with the exception of the ion exchange resin treatment, a control was prepared.

The control having a 65.5° Brix was cold-packed in seven 46-oz. cans and seven 6-oz. cans. One 46-oz. can of treated sample and one 46-oz. can of control were dried on a conventional vacuum shelf dryer on aluminum pans. Water temperature in the shelves was about 160° F. and the vacuum was below 1.3 mm. Product temperature reached a maximum of about 135° F. after about one hour at which time the dried product in sponge-like form was removed from the drying chamber and conveyed to a low humidity room for removal from the trays.

EXAMPLE V 82.2 lbs. of orange wash pulp (OWP) at 65° Brix having a total solids content of 53.4 lbs. were diluted to 20° Brix with water. 53.4 lbs. of wet Amberlite IR–120 H resin were added to the juice and the mixture was agitated for 15 minutes. The resin was separated from the juice. The pH of the OWP which originally was 3.55 was now 1.75 and was readjusted to 3.55 with potassium hydroxide. The OWP was concentrated to 64.2° Brix using a thermally accelerated short time evaporator. The juice was cold-packed in eleven 46-oz. cans and seven 6-oz. cans. In like manner, with the exception of the ion exchange resin treatment, a control was prepared having a 65° Brix and was packed in five 46-oz. cans and seven 6-oz. cans.

One 46-oz. can of treated sample and one 46-oz. can of control were dried on a conventional vacuum shelf dryer on aluminum pans. The water temperature in the shelves was about 160° F. and the vacuum was maintained below 1 mm. The product temperautre reached a maximum of about 140° F. after about an hour at which time the dried product in sponge-like form was removed from the drying chamber and conveyed to a low humidity room for removal from the trays.

EXAMPLE VI

Using the dried treated and dried untreated products of Examples IV and V, four samples of 100 gm. of 10% orange juice drink formulations were prepared, each containing about 10% by weight of the respective dried orange juice product, about 87% by weight of sucrose, the balance being citric acid, ascorbic acid, F.D.A. approved coloring agents and encapsulated oils. Each of the four preparations was diluted with 668 gm. of water to give 768 gm. of a 13° Brix orange juice drink.

The samples were taste tested and the taste test panel recognized the difference between the treated sample and the untreated sample of each example. The treated products in each case were described by the panel members as sweeter and milder than the corresponding untreated products which were considered to be tart or tangy by comparison.

A similar taste test was conducted using the treated sample of Example IV and the treated sample of Example V. The panel recognized no noticeable difference in flavor between the two treated samples.

EXAMPLE VII 350 ml. of homogenized pasteurized milk were treated with 200 ml. of Dowex–50 resin. The milk was separated from the resin and the pH of the milk, which was 1.88 after treatment, was readjusted to the original pH of 6.67 with a potassium hydroxide solution. 100 ml. of treated milk and 100 ml. of a control were heated for 10 minutes in a boiling water bath and were then cooled to room temperature. The treated sample of milk exhibited less cooked taste than the untreated sample.

EXAMPLE VIII 300 ml. of Carling Black Label draft beer were treated with 200 ml. of Dowex–50 resin. The beer was separated from the resin and the pH of the beer which was 1.92 after treatment was readjusted to the original pH of 4.08 using a potassium hydroxide solution. 100 ml. of treated beer and 100 ml. of a control were heated for 10 minutes in a boiling water bath and were then cooled to room temperature. The treated sample of beer exhibited less bitterness than the untreated sample.

Having described my invention, what I claim as new and desire to secure by Leters Patent is:

1. A process for treating a citrus fruit juice, the good natural flavor, aroma or color of which is adversely affected by pasteurization heating, to retard the formation of poor unnatural flavor, aroma or color caused by such heating thereby retaining the good natural flavor, aroma and color, which comprises:
  (a) providing the citrus fruit juice, which has a predetermined pH consistent with good natural flavor, aroma and color;
  (b) contacting the juice with a cationic exchange resin thereby lowering the pH thereof;
  (c) separating the juice from the resin;
  (d) contacting the juice with a metallic hydroxide to raise the pH thereof to about said predetermined pH; and
  (e) heating to pasteurize the juice.

2. The process of claim 1 in which the cationic exchange resin is a strong cationic exchange resin.

3. The process of claim 1 in which the ratio of soluble solids of the liquid to the resin is less than one pound of soluble solids per pound of wet resin.

4. The process of claim 1 in which the ratio of soluble solids of the liquid to the resin is at least one pound of wet resin per pound of soluble solids.

5. The process of claim 1 in which the liquid is orange juice.

6. The process of claim 1 in which the liquid is lemon juice.

7. The process of claim 1 in which the liquid is treated with a strong cationic exchange resin, the ratio of soluble solids in the liquid to the resin being less than one pound of soluble solids per pound of wet resin.

8. The process of claim 1 in which the liquid following treatment with the resin and separation therefrom is converted to dried form.

9. A process for treating an orange fruit juice, the good natural flavor of which is adversely affected by pasteurization heating, to retard the formation of poor unnatural flavor, aroma or color caused by such heating thereby retaining the good natural flavor, aroma and color, which comprises:
  (a) providing the orange fruit juice, which has a predetermined pH of about 3.5 to about 3.8 consistent with good natural flavor, aroma and color;
  (b) contacting the juice with a cationic exchange resin thereby lowering the pH thereof to between about 1.75 and about 3;
  (c) separating the juice from the resin;
  (d) contacting the juice with a metallic hydroxide to raise the pH thereof to about said predetermined pH; and
  (e) heating to pasteurize the juice.

10. The process of claim 9 wherein the metallic hydroxide is potassium hydroxide.

11. The process of claim 1 in which the juice is concentrated after treatment with resin and separation therefrom.

References Cited
UNITED STATES PATENTS

| | | | |
|---|---|---|---|
| 2,478,298 | 8/1949 | Meschter et al. | 99—105 |
| 2,667,417 | 1/1954 | Delmousee et al. | 99—105 |
| 2,928,744 | 3/1960 | Ponting | 99—105 |
| 2,929,720 | 3/1960 | Whittenberger | 99—105 |
| 3,165,415 | 1/1965 | Kilburn et al. | 99—105 |
| 3,219,458 | 11/1965 | Higby et al. | 99—155 |

FOREIGN PATENTS 1,465,549  12/1966  France.

WILBUR L. BASCOMB, Jr., Primary Examiner

P. VAN WYCK, Assistant Examiner

U.S. Cl. X.R.

426—271, 330, 521